US011938509B2

(12) United States Patent
Chen et al.

(10) Patent No.: US 11,938,509 B2
(45) Date of Patent: Mar. 26, 2024

(54) GLUE DISPENSING DEVICE AND METHOD THEREOF

(71) Applicant: KULICKE AND SOFFA HI-TECH CO., LTD., New Taipei (TW)

(72) Inventors: Lu-Min Chen, Taipei (TW); Tsung-Lin Tsai, Taipei (TW)

(73) Assignee: Kulicke and Soffa Hi-Tech Co Ltd., New Taipei (TW)

( * ) Notice: Subject to any disclaimer, the term of this patent is extended or adjusted under 35 U.S.C. 154(b) by 0 days.

(21) Appl. No.: 17/750,290

(22) Filed: May 20, 2022

(65) Prior Publication Data

US 2023/0356257 A1 Nov. 9, 2023

(51) Int. Cl.
*B05C 5/02* (2006.01)

(52) U.S. Cl.
CPC .................................. *B05C 5/0208* (2013.01)

(58) Field of Classification Search
None
See application file for complete search history.

(56) References Cited

U.S. PATENT DOCUMENTS 2,375,971 A * 5/1945 Windschauer ........... D06B 3/04 493/463
2,644,717 A * 7/1953 Kopperschmidt ........ B05B 7/08 239/105
3,031,872 A * 5/1962 Kusters .................. D06C 15/08 118/200
3,462,128 A * 8/1969 Dufour ................... B29B 7/407 222/137
4,477,191 A * 10/1984 Ersfeld ................. B29B 7/7673 222/137
4,572,103 A * 2/1986 Engel ................... H05K 3/3485 118/410
4,715,313 A * 12/1987 Ecer .......................... B22F 7/08 427/181

(Continued)

FOREIGN PATENT DOCUMENTS

| | | |
|---|---|---|
| CN | 108453005 | 8/2018 |
| TW | M632643 | 10/2022 |

OTHER PUBLICATIONS

Taiwanese Search Report for Taiwan Patent Application No. Application No. 111117067.

*Primary Examiner* — Jethro M. Pence
(74) *Attorney, Agent, or Firm* — Christopher M. Spletzer, Sr.

(57) ABSTRACT

A glue dispensing device comprises a base, a pressure control unit, a quantitative glue supply unit and a glue dispensing needle. The base comprises a pressure control chamber and a glue tube body, the pressure control chamber is located inside the base, the glue tube body extends from one end of the base to the other end, and the glue tube body penetrates the pressure control chamber. The pressure control unit is coupled to the pressure control chamber. The quantitative glue supply unit is disposed at one end of the base body and is coupled to the glue tube body. The glue dispensing needle is disposed at the other end of the base and is coupled to the glue tube body. The glue dispensing device uses the pressure change of the pressure control chamber to deform the glue tube body, thereby achieving quantitative glue dispensing effect with accuracy and stability. In addition, a glue dispensing method is also disclosed.

17 Claims, 3 Drawing Sheets

(56) References Cited

U.S. PATENT DOCUMENTS

| | | | | |
|---|---|---|---|---|
| 4,740,089 | A * | 4/1988 | Fiorentini | B29B 7/7668 366/159.1 |
| 4,941,428 | A * | 7/1990 | Engel | H05K 3/0091 118/680 |
| 5,788,128 | A * | 8/1998 | Hickey | B65C 9/2221 222/504 |
| 6,068,202 | A * | 5/2000 | Hynes | H05K 3/0091 239/290 |
| 6,117,490 | A * | 9/2000 | Nishida | B05C 5/0254 118/232 |
| 6,983,860 | B2 * | 1/2006 | Arnaboldi | B05C 5/02 222/146.2 |
| 7,018,477 | B2 * | 3/2006 | Engel | H05K 13/046 118/683 |
| 7,659,963 | B2 * | 2/2010 | Kweon | B08B 5/04 349/189 |
| 7,726,516 | B2 * | 6/2010 | Engel | B05C 11/1002 222/63 |
| 7,836,844 | B2 * | 11/2010 | Golovin | F28F 19/04 118/DIG. 10 |
| 7,997,446 | B2 * | 8/2011 | Engel | B05C 11/1002 222/64 |
| 9,446,422 | B2 * | 9/2016 | Jones | B05B 7/06 |
| 9,808,822 | B2 * | 11/2017 | Mårtensson | B05B 13/0221 |
| 10,239,084 | B2 * | 3/2019 | Märtensson | B41J 2/14 |
| 10,549,306 | B2 * | 2/2020 | Martensson | B05B 17/0607 |
| 10,668,491 | B2 * | 6/2020 | Herre | B01F 25/43161 |
| 10,807,110 | B2 * | 10/2020 | Herre | B05B 15/55 |
| 10,974,273 | B2 * | 4/2021 | Bergstrom | H05K 3/1241 |
| 11,384,862 | B2 * | 7/2022 | Ikushima | B05C 5/0225 |
| 11,433,418 | B2 * | 9/2022 | Gould | F24H 1/10 |
| 11,456,564 | B2 * | 9/2022 | Ikushima | B05B 12/08 |
| 2003/0132243 | A1 * | 7/2003 | Engel | H05K 13/046 222/61 |
| 2005/0211166 | A1 * | 9/2005 | Engel | H05K 13/046 118/697 |
| 2009/0220385 | A1 * | 9/2009 | Brown | B01F 33/84 422/400 |
| 2022/0331831 | A1 * | 10/2022 | Chen | G01F 11/44 |

* cited by examiner

GLUE DISPENSING DEVICE AND METHOD THEREOF

BACKGROUND OF THE INVENTION

1. Field of the Invention

The invention relates to a glue dispensing device and a glue dispensing method, and more particularly, to a glue dispensing device and a glue dispensing method capable of dispensing quantitative glue with accuracy and stability.

2. Description of the Prior Art

The bonding technology is commonly used in the semiconductor industry. The bonding technology is to apply glue to the chip or the substrate where it is to be bonded, and then place another chip or substrate at the desired bonding position, so that the chip and the substrate are bonded to each other, or the chips are bonded to each other.

The existing glue dispensing device includes a main body, a glue supply unit and at least one glue dispensing needle, and the main body has at least one glue discharging channel. One end of the glue discharging channel is coupled to the glue supply unit, and the other end of the glue discharging channel is coupled to the glue dispensing needle. The glue supply unit provides glue, and the glue flows to the glue dispensing needle through the glue discharging channel for the glue dispensing process.

Although the existing glue dispensing device can achieve the effect of glue dispensing, there are still many shortcomings, such as:

Disadvantage 1: After the glue reaches the dispensing needle, the glue can only flow out of the dispensing needle with the aid of gravity and the pushing force of the subsequent glue to break through the surface tension. However, when the glue just breaks through the surface tension of the needle and flows out of the glue dispensing needle, the initial amount of glue output will be large and abnormal since the accumulated pressure is released, and the amount of glue output will gradually decrease after a period of time. The amount of glue output tends to stable gradually when the glue dispensing process moves on. When the glue dispensing process is stopped, the residual pressure of the needle will be slowly released, causing some residual glue to flow out slowly.

As mentioned above, it is difficult for the glue dispensing needle to stably control the glue output at the beginning or end of the glue dispensing process.

Disadvantage 2: Glue is a viscous fluid, so the flow rate or the amount of the glue may be affected by external environmental factors such as the machine itself, temperature and humidity during the bonding process, or the glue supply unit, and the glue output will tend to inaccurate and not quantitative.

As described above, in view of the shortcomings of the conventional technology that cannot provide stable and accurate means to dispense glue, it is necessary to seek improvement of prior art techniques.

SUMMARY OF THE INVENTION

In view of the above-mentioned shortcomings of the prior art, after years of researches and efforts, the inventor of the present invention has successfully developed the glue dispensing device and the glue dispensing method of the present application.

The present invention discloses a glue dispensing device, which comprises a base, a pressure control unit, a quantitative glue supply unit and a glue dispensing needle. The base comprises a pressure control chamber and a glue tube body, the pressure control chamber is located inside the base, the glue tube body extends from one end of the base to the other end, and the glue tube body penetrates the pressure control chamber. The pressure control unit is coupled to the pressure control chamber. The quantitative glue supply unit is disposed at one end of the base body and is coupled to the glue tube body. The glue dispensing needle is disposed at the other end of the base and is coupled to the glue tube body.

In an embodiment of the present invention, the glue tube body is an elastic tube body or a rubber tube.

In an embodiment of the present invention, the pressure control unit is a pressure regulating device.

In an embodiment of the present invention, the pressure control unit is coupled to the pressure control chamber through a joint.

In an embodiment of the present invention, the quantitative glue supply unit is a single screw pump, a mono pump or a piston pump.

In an embodiment of the present invention, the quantitative glue supply unit comprises a rotor and a stator, the stator is located outside the rotor, the stator is an elastic body, and the rotor is an eccentric screw.

In an embodiment of the present invention, a glue quantity sensing unit is disposed on the glue dispensing needle to sense a glue output of the glue dispensing needle.

The present invention discloses a glue dispensing device comprises a base and a glue dispensing needle. The base comprises a pressure control chamber and a glue tube body, wherein the pressure control chamber is located inside the base, the glue tube body extends from one end of the base to the other end, and the glue tube body penetrates the pressure control chamber. The glue dispensing needle is disposed at one end of the base and coupled to the glue tube body.

The present invention discloses a glue dispensing method, comprising the following steps of: a quantitative glue supply unit providing a glue to a glue dispensing needle through a glue tube body; when the glue of the glue dispensing needle is about to break through the surface tension and flow out of the dispensing needle, a pressure control unit providing a pressurized air to a pressure control chamber, so as to increase the pressure inside the pressure control chamber to pressurize the glue tube body, and to make the pressurized glue tube body to compress inward, causing the glue inside the glue tube body to be squeezed to the glue dispensing needle, thereby allowing the glue to overcome the surface tension to be stably output to the dispensing needle; and when a glue output of the glue dispensing needle reaches a required glue output, the pressure control unit stops providing the pressurized air to the pressure control chamber, allowing the pressure control chamber to return to a normal pressure state, and the glue tube body to return to an unpressurized state.

In an embodiment of the present invention, if the pressure inside the pressure control chamber cannot overcome the surface tension after the glue tube body is pressurized, the pressure control unit can provide the pressurized air to the pressure control chamber again or continuously, so as to increase the pressure inside the pressure control chamber to squeeze the glue tube body further to overcome the surface tension, thereby squeezing more glue to the glue dispensing needle.

With the above-mentioned glue dispensing device and the dispensing method, and using the pressure change of the pressure control chamber to deform the glue tube body, the present invention can achieve quantitative glue dispensing effect with accuracy and stability.

REFERENCE NUMERALS

Figure 1:
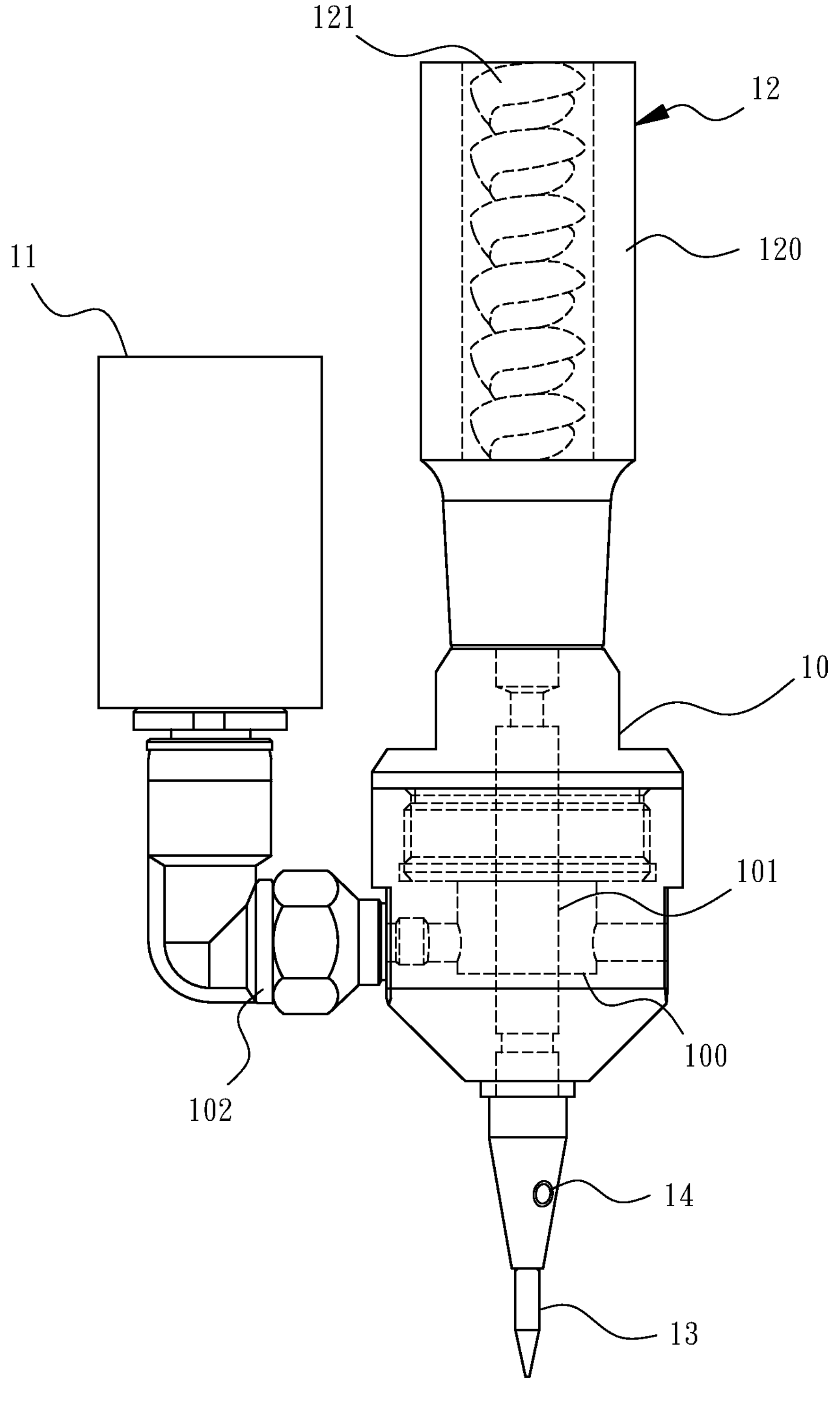
FIG. 1 illustrates a schematic view of a glue dispensing device according to an embodiment of the present invention.

10 base
100 pressure control chamber
101 glue tube body
102 joint
11 pressure control unit
12 quantitative glue supply unit
120 stator
121 rotor
13 glue dispensing needle
14 glue quantity sensing unit

DETAILED DESCRIPTION OF THE PREFERRED EMBODIMENT

In order to enable those skilled in the art to fully understand the technical features, content and advantages of the present invention and the effects that can be achieved, the present invention is hereby described in detail as follows in the form of embodiments in conjunction with the drawings. The purpose of the drawings used is only for illustration and auxiliary description, and may not necessarily be the real scale and precise configuration after the implementation of the present invention. Therefore, the proportion and configuration relationship of the attached drawings should not be interpreted or limited to the scope of rights in actual implementation will be described first.

Please refer to FIG. 1 for a schematic view of a glue dispensing device according to an embodiment of the present invention. As shown in the figure, the glue dispensing device includes a base 10, a pressure control unit 11, a quantitative glue supply unit 12, a glue dispensing needle 13, and a glue quantity sensing unit 14.

The base 10 comprises a pressure control chamber 100 and a glue tube body 101. The pressure control chamber 100 is located inside the base 10. The glue tube body 101 is located inside the base 10 and extends from one end of the base 10 to the other end, and the glue tube body 101 penetrates the pressure control chamber 100. The glue tube body 101 is an elastic tube body or a rubber tube.

The pressure control unit 11 is an air compressor. The pressure control unit 11 is coupled to the pressure control chamber 100 of the base 10 through a joint 102. The joint 102 can be a valve body, a two-way valve or a tube body.

The quantitative glue supply unit 12 is disposed at one end of the base 10 and is coupled to the glue tube body 101. The quantitative glue supply unit 12 is a mono pump or a piston pump. In an embodiment, the quantitative glue supply unit 12 is a mono pump, it includes a rotor 121 and a stator 120, and the stator 120 is located outside the rotor 121. The stator 120 is an elastic body. The rotor 121 is an eccentric screw. When the rotor 121 rotates, a chamber with the same cross-sectional area will be formed, and the liquid transported in the chamber will be divided into individual packets, so the quantitative glue supply unit 12 has the advantage of stable glue supply, and is not affected by the machine itself or external environmental factors during the bonding process.

When the quantitative glue supply unit 12 is a piston pump, the piston pump may be a single piston pump, a horizontal piston pump, an axial piston pump, or a radial piston pump. The single-piston pump comprises an eccentric wheel, a piston, a spring, a cylinder, and two one-way valves. A closed volume is formed between the piston and the cylinder bore. The horizontal piston pump mainly comprises a plurality of pistons (3 pistons or 6 pistons) installed in parallel, and a crankshaft is used to directly push the piston to move back and forth through the connecting rod slider or the eccentric shaft to provide the hydraulic pressure of suction and discharge. The axial piston pump is a piston pump in which the moving direction of the piston is parallel to the central axis of the cylinder. The radial piston pumps are divided into two types: pressure-driven oil supply type and self-priming oil type. The radial pistons are divided into two categories: pump valve distribution and axial distribution.

In an embodiment, the quantitative glue supply unit 12 is a piston pump, the piston pump maybe a positive displacement pump or a reciprocating pump. The piston pump makes the fluid flow by using the pressure difference generated by the reciprocating motion of the piston in the piston cylinder, which causes the change of the sealing volume in the piston cylinder. Therefore, the delivery volume or flow rate of the fluid can be controlled by adjusting the pressure difference. Thus the piston pump can provide a quantitative amount of glue through the control of the pressure difference, and is not affected by the machine itself or external environmental factors during the bonding process.

The glue dispensing needle 13 is disposed at the other end of the base 10 and is coupled with the glue tube body 101.

The glue quantity sensing unit 14 is disposed on the glue dispensing needle 13 to sense the glue output from the dispensing needle 13. The glue sensing unit 14 can be a proximity switch, a capacitive sensor, or an optical sensor. The glue sensing unit 14 is electrically connected to the pressure control unit 11.

Figure 2:
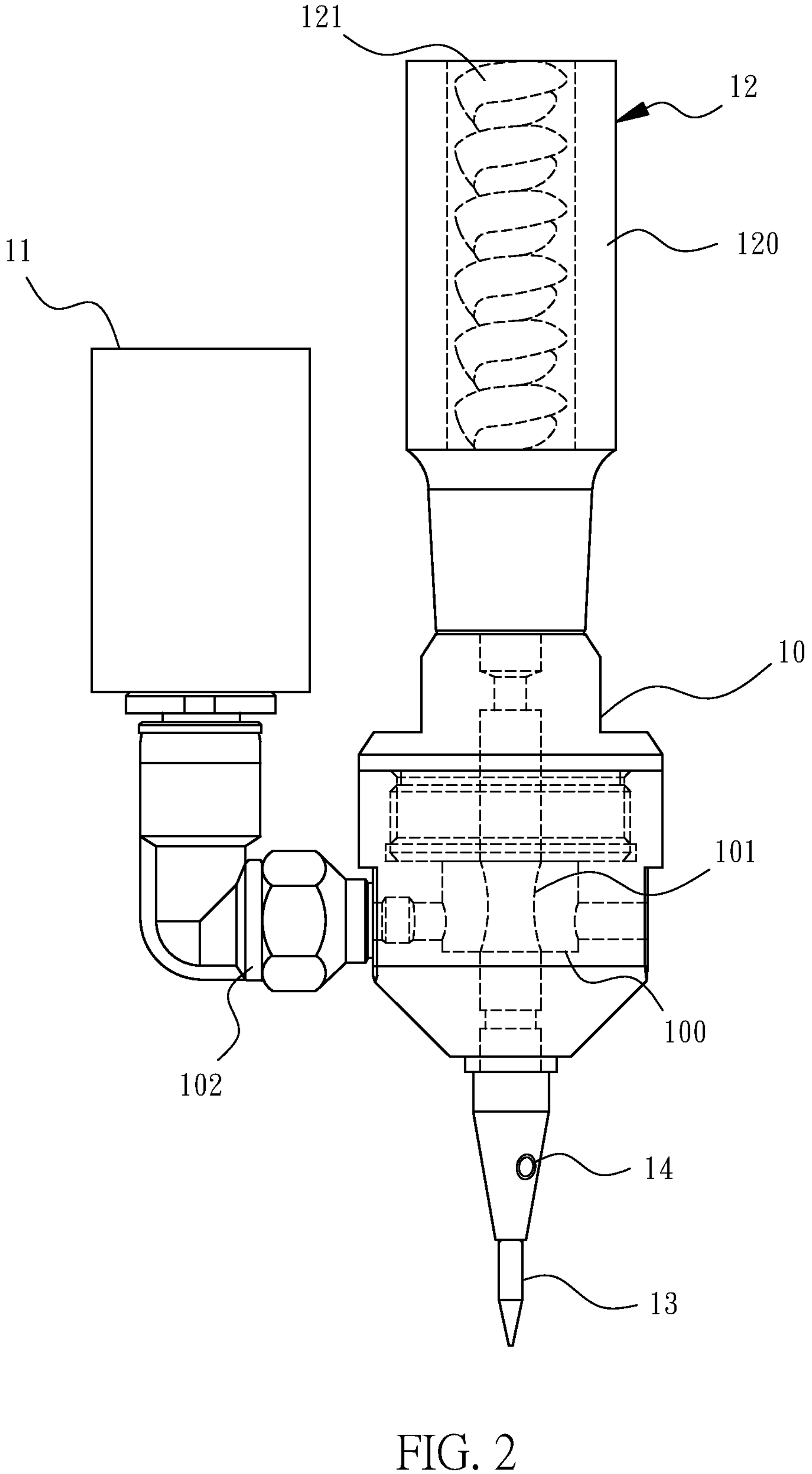
FIG. 2 illustrates a schematic view of a pressure control chamber of the glue dispensing device in a pressurized state according to an embodiment of the present invention.

Please refer to FIG. 2 for a schematic view of a pressure control chamber of the glue dispensing device in a pressurized state according to an embodiment of the present invention. As shown in the figure, before the glue dispensing process, the glue sensing unit 14 sends a glue dispensing signal to the pressure control unit 11, and the pressure control unit 11 provides a pressurized air. The pressurized air enters the inside of the pressure control chamber 100 through the joint 102 to increase the pressure inside the pressure control chamber 100, and the pressurized air compresses the glue tube body 101 to push it further inward, so as to squeeze the glue inside the glue tube body 101 to the dispensing needle 13, thereby increasing the amount of glue at the dispensing needle 13, and making the glue overcome the surface tension to be able to flow out of the dispensing needle 13, and in a very short time, the amount of glue output will be increased to a stable output, so that problems in the prior art such as the glue output at the initial stage of glue dispensing will slowly increase and the glue could overflow in the subsequent process can be eliminated.

If the pressure inside the pressure control chamber 100 cannot overcome the surface tension after the glue tube body 101 is pressurized, the pressure control unit 11 can provide the pressurized air to the pressure control chamber 100 again or continuously, so as to increase the pressure inside the pressure control chamber 100 to squeeze the glue tube body 101 further to overcome the surface tension, thereby squeezing more glue to the glue dispensing needle 13.

In addition, after the glue has been dispensed for a period of time, when the glue sensing unit 14 sends a signal to the pressure control unit 11 to indicate that the amount of glue dispensed has reached the standard, the internal pressure of the pressure control chamber 100 is gradually restored to an original unpressurized state, and the glue tube body 101 is gradually restored to the state where it is not squeezed. The internal pressure of the pressure control chamber 100 can be released to the pressure control unit 11 through the joint 102, so that the internal pressure of the pressure control chamber 100 can return to the original unpressurized state.

The quantitative glue supply unit 12 can supply glue stably and quantitatively, so the glue dispensing speed of the dispensing needle 13 can be maintained stable, and the glue flow rate can be maintained stable, thereby achieving accurate and quantitative effects.

If the glue sensing unit 14 senses that the glue output of the dispensing needle 13 is not normal and maintenance is required, for example, the dispensing needle 13 is blocked or stained, or the dispensing needs to be stopped during the dispensing process. Then the glue sensing unit 14 sends an alerting signal to the pressure control unit 11.

Figure 3:
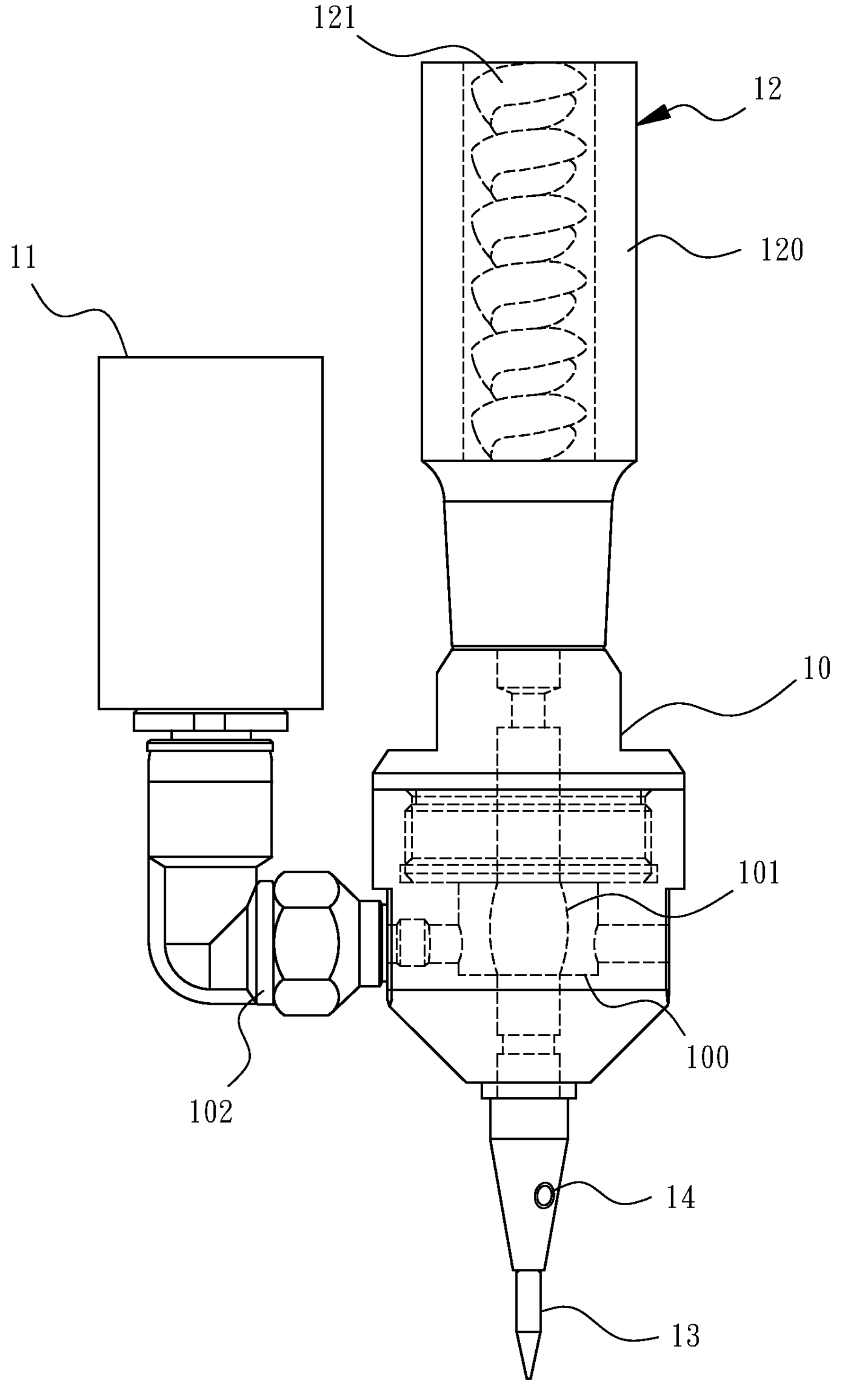
FIG. 3 illustrates a schematic view of the pressure control chamber of the glue dispensing device in a decompressed state according to an embodiment of the present invention.

Please refer to FIG. 3 for a schematic view of the pressure control chamber of the glue dispensing device in a decompressed state according to an embodiment of the present invention. As shown in the figure, the pressure control unit 11 provides a negative pressure (suction) to the pressure control chamber 100 through the joint 102 to reduce the internal pressure of the pressure control chamber 100. The glue tube body 101 is affected by the low pressure of the pressure control chamber 100 and expands outward, so that the glue stays inside the glue tube body 101, and the glue dispensing needle 13 stops dispensing the glue. Then a person can clean, repair or replace the dispensing needle 13.

If the glue sensing unit 14 senses that the glue is still flowing out of the dispensing needle 13, the glue sensing unit 14 sends an alerting signal to the pressure control unit 11, and the pressure control unit 11 further provides negative pressure to decrease the pressure inside the pressure control chamber 100 again. The internal pressure of the pressure control chamber 100 is controlled to make the glue pipe body 101 expand more, so as to further prevent the glue from flowing out of the glue dispensing needle 13.

As mentioned above, if the pressure control chamber 100 is not decompressed enough to prevent the glue from flowing out of the dispensing needle 13 after the above negative pressure is provided, the pressure control unit 11 can again or continuously provide negative pressure to the pressure control chamber 100 to reduce the pressure inside the pressure control chamber 100, so that the glue tube body 101 expands more, thereby preventing the glue from flowing out of the dispensing needle 13.

When the above maintenance, cleaning or replacement is completed, the pressure control unit 11 stops decompressing, the internal pressure of the pressure control chamber 100 is gradually restored to the initial state which it was not decompressed, and the glue tube body 101 is gradually restored to an unexpanded state. The pressure control unit 11 provides a positive pressure to the pressure control chamber 100 through the joint 102, or external air flows into the pressure control chamber 100 through the joint 102, so as to restore the internal pressure of the pressure control chamber 100 to the initial state which it was not decompressed, and allow the glue to flow out of the dispensing needle 13.

A glue dispensing method according to an embodiment of the present invention comprises the steps of:

Step 1: dispensing glue stably, please refer to FIG. 1 again. The quantitative glue supply unit 12 provides glue to the glue dispensing needle 13 through the glue tube body 101.

Step 2: dispensing quantitative glue precisely, please refer to FIG. 2 again. The glue sensing unit 14 sends a glue dispensing signal to the pressure control unit 11, and the pressure control unit 11 provides a pressurized air. The pressurized air enters the inside of the pressure control chamber 100 through the joint 102 to increase the pressure inside the pressure control chamber 100, and the pressurized air compresses the glue tube body 101 to push it further inward, so as to squeeze the glue inside the glue tube body 101 to the dispensing needle 13, thereby increasing the amount of glue at the dispensing needle 13, and making the glue overcome the surface tension to be able to flow out of the dispensing needle 13 with a normal flow rate, and in a very short time, the amount of glue output will be increased to a stable output.

If the pressure inside the pressure control chamber 100 cannot overcome the surface tension after the glue tube body 101 is pressurized, the pressure control unit 11 can provide the pressurized air to the pressure control chamber 100 again or continuously, so as to increase the pressure inside the pressure control chamber 100 to squeeze the glue tube body 101 further to overcome the surface tension, thereby squeezing more glue to the glue dispensing needle 13.

Step 3: restoring the pressure of pressure control chamber 100 to a normal pressure. When the glue sensing unit 14 sends a signal to the pressure control unit 11 to indicate that the amount of glue dispensed has reached the standard, the internal pressure of the pressure control chamber 100 is gradually restored to an original unpressurized state, and the glue tube body 101 is gradually restored to the state where it is not squeezed. The internal pressure of the pressure control chamber 100 can be released to the pressure control unit 11 through the joint 102, so that the internal pressure of the pressure control chamber 100 can return to the original unpressurized state.

Step 4: stopping glue dispensing or doing maintenance, please refer to FIG. 3 again. When the glue sensing unit 14 senses that the glue output of the dispensing needle 13 is not normal and maintenance is required, for example, the dispensing needle 13 is blocked or stained, or the dispensing needs to be stopped for maintenance or replacement. The pressure control unit 11 provides a negative pressure to the pressure control chamber 100 to reduce the internal pressure of the pressure control chamber 100. The glue tube body 101 is affected by the low pressure of the pressure control chamber 100 and expands outward, so that the glue stays inside the glue tube body 101, and the glue dispensing needle 13 stops dispensing the glue. Then a person can clean, repair or replace the dispensing needle 13.

If the glue is still flowing out of the dispensing needle 13, the pressure control unit 11 further provides negative pressure to decrease the pressure again. The internal pressure of the pressure control chamber 100 is controlled to make the glue pipe body 101 expand more, so as to further prevent the glue from flowing out of the glue dispensing needle 13.

Step 5: restoring the pressure of pressure control chamber 100 to a normal pressure. When the glue sensing unit 14 sends a signal to the pressure control unit 11 to indicate that there is no abnormality found in the glue dispensing needle 13, the pressure control unit 11 stops providing negative pressure, and the internal pressure of the pressure control chamber 100 is gradually restored to the initial state which it was not decompressed, and the glue tube body 101 is gradually restored to an unexpanded state. The external air can flow into the pressure control chamber 100 through the joint 102, so as to restore the internal pressure of the pressure control chamber 100 to the initial state which it was not decompressed (that is, the normal pressure state).

As mentioned above, the present invention uses the pressure change of the pressure control chamber 100 to deform the glue tube body 100, thereby achieving quantitative glue dispensing effect with accuracy and stability.

The above descriptions are only exemplary, and are used to illustrate the preferred embodiments of the technical content of the present invention, but are not intended to limit the present invention. Equivalent replacements, modifications or alterations made by those skilled in the art based on the teachings of the contents disclosed in the specification are included in the claims of the present invention without departing from the scope of the present invention.

What is claimed is:

1. A glue dispensing device, comprising:

a base comprising a pressure control chamber and a glue tube body, wherein the pressure control chamber is located inside the base, the glue tube body extends from one end of the base to another end, and the glue tube body penetrates the pressure control chamber;

a pressure control unit being coupled to the pressure control chamber;

a quantitative glue supply unit being disposed at the one end of the base and coupled to the glue tube body; and a glue dispensing needle being disposed at the another end of the base and coupled to the glue tube body, wherein the pressure control unit provides a pressurized air to the pressure control chamber to increase a pressure inside the pressure control chamber, the increased pressure inside the pressure control chamber compressing the glue tube body causing a glue inside the glue tube body to be squeezed to the glue dispensing needle, thereby allowing the glue to overcome a surface tension to be stably output.

2. The glue dispensing device as claimed in claim 1, wherein the glue tube body is an elastic tube body or a rubber tube.

3. The glue dispensing device as claimed in claim 1, wherein the pressure control unit is an air compressor.

4. The glue dispensing device as claimed in claim 1 further comprising a joint through which the pressure control unit is coupled to the pressure control chamber.

5. The glue dispensing device as claimed in claim 1, wherein the quantitative glue supply unit is a single screw pump, a mono pump, or a piston pump.

6. The glue dispensing device of claim 1, wherein the quantitative glue supply unit comprises a rotor and a stator, the stator is located outside the rotor, the stator is an elastic body, and the rotor is an eccentric screw.

7. The glue dispensing device as claimed in claim 1 further comprising a glue quantity sensing unit disposed on the glue dispensing needle to sense a glue output of the glue dispensing needle.

8. The glue dispensing device of claim 1 wherein the pressure control unit is configured to stop providing the pressurized air to the pressure control chamber when a glue output of the glue dispensing needle reaches a required glue output, allowing the pressure control chamber to return to a normal pressure state, and allowing the glue tube body to return to an unpressurized state.

9. The glue dispensing device of claim 1 wherein the pressure control unit is configured to provide a negative pressure (suction) to the pressure control chamber, causing the glue tube body to expand outward, so that the glue stays inside the glue tube body, and the glue dispensing needle stops dispensing glue.

10. The glue dispensing device of claim 7 wherein the glue quantity sensing unit is a proximity switch, a capacitive sensor, or an optical sensor.

11. The glue dispensing device of claim 7 wherein the glue quantity sensing unit is configured to send a signal to the pressure control unit after an amount of the glue dispensed has reached a standard to gradually reduce an internal pressure of the pressure control chamber to an original unpressurized state to where the glue tube body is not squeezed.

12. The glue dispensing device of claim 7 wherein the glue sensing unit is configured to send an alerting signal to the pressure control unit when the glue output is not normal.

13. The glue dispensing device of claim 12 wherein the alerting signal indicates that the glue dispensing needle is blocked.

14. The glue dispensing device of claim 12 wherein the alerting signal indicates that the glue is still flowing out of the glue dispensing needle.

15. The glue dispensing device of claim 12 wherein, after receiving the alerting signal, the pressure control unit provides negative pressure to decrease the pressure inside the pressure control chamber, causing the glue tube body to expand, thus preventing the glue from flowing out of the glue dispensing needle.

16. The glue dispensing device of claim 1 wherein, if the pressure inside the pressure control chamber cannot overcome the surface tension after the glue tube body is pressurized, the pressure control unit is configured to provide the pressurized air to the pressure control chamber again, so as to increase the pressure inside the pressure control chamber to squeeze the glue tube body further to overcome the surface tension, thereby squeezing more of the glue to the glue dispensing needle.

17. The glue dispensing device of claim 4 wherein the joint is a valve body, a two-way valve, or a tube body.

* * * * *